United States Patent [19]

Lützeler

[11] Patent Number: 4,973,123
[45] Date of Patent: Nov. 27, 1990

[54] ELECTRO-OPTICAL ROTARY COUPLING SUITABLE FOR TAPE SCANNERS

[75] Inventor: Jörn Lützeler, Zwingenberg, Fed. Rep. of Germany

[73] Assignee: BTS Broadcast Television Systems GmbH, Darmstadt, Fed. Rep. of Germany

[21] Appl. No.: 400,160

[22] Filed: Aug. 29, 1989

[30] Foreign Application Priority Data

Sep. 13, 1988 [DE] Fed. Rep. of Germany ....... 3831143

[51] Int. Cl.$^5$ .......................... G02B 6/26; G01D 9/00; H01R 3/00
[52] U.S. Cl. ............................. 350/96.15; 350/96.20; 346/33 A; 439/164; 360/55; 369/44.11
[58] Field of Search ............... 350/96.10, 96.15, 96.20, 350/96.21, 96.22, 574; 346/33 A; 250/227, 551, 552, 553, 223, 211 J; 439/164, 10, 11, 13, 24; 360/55, 63, 108; 369/44, 97, 111–114

[56] References Cited

U.S. PATENT DOCUMENTS

| | | | |
|---|---|---|---|
| 2,935,573 | 5/1960 | Haarler et al. | 350/66 |
| 3,588,218 | 6/1971 | Hunt | 350/6.5 |
| 3,823,276 | 7/1974 | Maslowski et al. | 369/111 |
| 4,109,998 | 8/1978 | Iverson | 350/574 |
| 4,190,775 | 2/1980 | Sakurai et al. | 250/211 J |
| 4,511,934 | 4/1985 | Ohira et al. | 360/108 X |
| 4,753,506 | 6/1988 | Einhorn et al. | 350/96.15 |

Primary Examiner—Akm Ullah
Attorney, Agent, or Firm—Frishauf, Holtz, Goodman & Woodward

[57] ABSTRACT

A device for transmission of signals between a stationary element and an element rotating about an axis (8), such as the headwheel (20) of a videotape apparatus, features optical transmission. At least two opto-electrical converters such as photodiodes (9, 10) are provided on one part (6, 7). At least two electro-optical converters such as laser diodes (4, 5) are provided on the other part (1, 34, 42), arranged such that beams (11, 12; 28, 29) generated by the electro-optical converters (4, 5) strike the opto-electrical converters (9, 10) at an acute angle to their axis (8). Preferably, a ring-shaped transparent body (26–31) with a trapezoidal or prism-shaped cross-section surrounds each photodiode and serves to bend the light beam toward the axis (8). Electrical connecting leads (14, 15, 16) which connect the opto-electrical converters (9, 10) to further elements (65) on their part are placed at least partially off the axis (8) of that part (6, 7). Based on the recognition that each magnetic head (65) is generally out of operative relation with the magnetic tape (64) for a portion of each revolution, the optical transmission paths can be harmlessly interrupted (FIG. 4) during said portion (62–63), and thus can be arranged diagonally, rather than axially, as in the prior art. This permits multiple data channels without multiplexing a single axially directed optical transmission.

6 Claims, 2 Drawing Sheets

ELECTRO-OPTICAL ROTARY COUPLING SUITABLE FOR TAPE SCANNERS

The present invention relates generally to transmission of signals within a device, such as a tape scanner, having a rotating element and a stationary element, and more particularly, to an electro-optical transmission system which is less subject to electronic noise than the systems heretofore used.

BACKGROUND OF THE INVENTION

In magnetic tape devices with rotating headwheels, it is particularly necessary to have noise-free transmission of signals to the headwheel and from the headwheel to stationary portions of the device. After initial attempts using slip-rings, it was found that rotating magnetic transducers provided satisfactory performance. However, newer devices, for recording of digital video signals, have such large data streams that transmission by means of magnetic transducers runs into difficulties.

It is known to use optical devices for transmission of signals between the headwheel of a videotape device and its stationary portion. These devices, however, operate with an axially aligned light beam, which necessitates elaborate multiplexing systems if simultaneous transmission of multiple signal channels is required.

SUMMARY OF THE INVENTION

Accordingly, it is an object of the present invention to provide a multi-channel apparatus, for transmission of signals between a stationary component and a rotating component, which does not require expensive multiplexing and demultiplexing circuitry.

Briefly, this is accomplished by placing a two or more opto-electrical converters such as photodiodes on the axis of rotation of the headwheel and directing light beams onto them at an angle from laser diodes or the like mounted on the surrounding stator. Preferably, the photodiodes are mounted in the center of transparent disks or rings of glass or the like. These can also form conduits for passage of connecting leads. In this manner, multiple signal channels to the rotating part and from the rotating part can be transmitted. The invention is based upon recognition of the fact that, in practically all magnetic tape devices with rotating headwheels, not all of the magnetic heads are engaged with the tape at a given time. So, for example, in a magnetic tape device in which the tape makes a 270° loop around the headwheel and associated drum, each head is out of engagement with the tape for about 90° of each rotation. During this time, recording mode does not require transmission of signals to that head. Similarly, that head is not generating any signals during that portion of playback mode, so interruption of a diagonally directed optical path does no harm.

DRAWINGS

Several embodiments of the invention are illustrated in the following figures, of which:

DETAILED DESCRIPTION OF THE PREFERRED EMBODIMENTS

Figure 1:
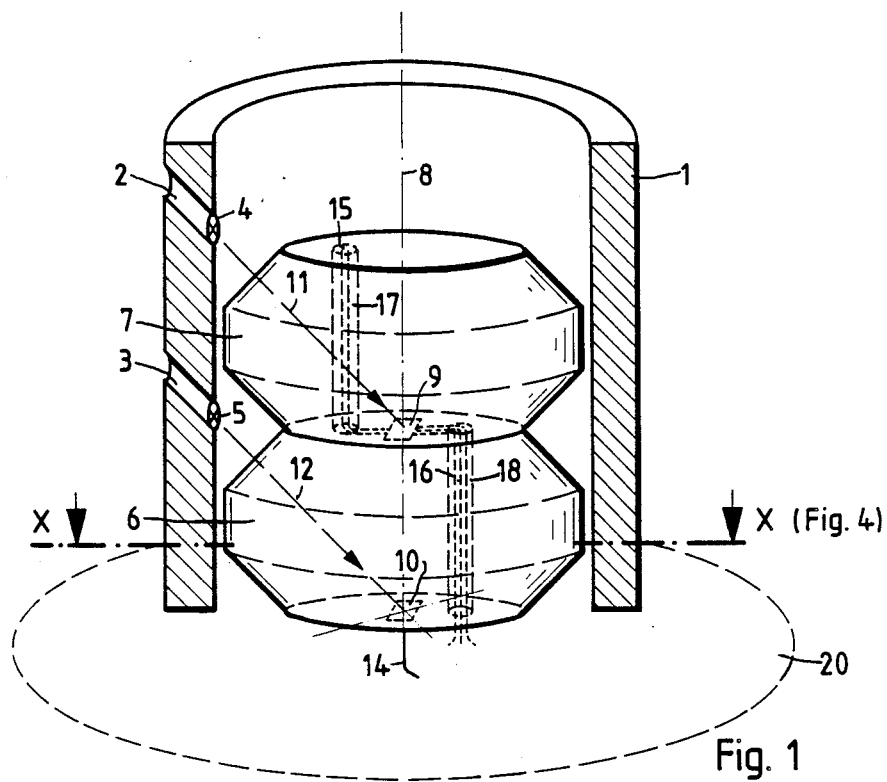
FIG. 1 is a partially sectioned perspective view of a first embodiment of the invention.

Elements which appear in more than one of the figures are designated with the same reference numerals. In the following description of the various embodiments, the stationary portion of the apparatus of the invention is referred to as the "stator", while the rotating portion is referred to as the "rotor". Further, the terms "transmitter" and "receiver" are used for the electrical-to-optical converter and the optical-to-electrical converter. Preferably the transmitter is a laser diode, while the receiver may be a photodiode or phototransistor.

In the embodiment shown in FIG. 1, the stator comprises a hollow cylinder 1 formed with two diagonal bores 2, 3 for mounting of two respective laser diodes 4, 5, indicated schematically.

The rotor comprises a stack of two flying-saucer-shaped glass bodies 6, 7 which are arranged concentrically with an axis 8 of a headwheel 20, indicated only schematically. Preferably, each glass body has a cylindrical central section, having a diameter almost as large as the inner diameter of stator 1, a flat top and bottom of reduced diameter, and upper and lower sections which slope frusto-conically inward from said central section to the flat top and bottom, respectively.

In the middle of the bottom surface of each glass body 6, 7, a respective photodiode 9, 10 is provided. Upper laser diode 4 generates a light beam 11 which strikes upper photodiode 9, and lower laser diode 5 generates a light beam 12 which strikes lower photodiode 10. The light beams are about normal to the glass body surface, and strike the photodiodes at an acute angle, but this still permits conversion of sufficient incident light to generate electrical signals. The dashed circle at the bottom of FIG. 1 indicates headwheel 20.

Connecting leads 14 from lower photodiode 10 to magnetic heads or other elements on headwheel 20 can be so arranged that neither of light beams 11, 12 is broken when the headwheel, and thus the rotor, rotates. Upper photodiode 9 in upper glass body 7 has similar connecting leads 16, for which a conduit 18 through lower glass body 6 is provided. Upon each rotor revolution, conduit 18 passes once through lower light beam 12. However, the angular position of conduit 18 in relation to the magnetic head, to which leads 14 from photodiode 10 connect, is selected such that the magnetic head is not in contact with the tape while conduit 18 and leads 16 are passing through beam 12.

When only two data channels are needed, it suffices to use a single glass body 6, on whose top and bottom panels a respective photodiode is placed. However, most videotape units require more channels, so FIG. 1 illustrates a second glass body 7, which is formed with a bore 17 for connecting leads 15. On top of this glass body 7, one could mount another glass body with a further photodiode, and so on, to provide enough channels.

In the embodiment of FIG. 1, glass bodies 6, 7 function essentially to support photodiode 9 and further photodiodes as necessary, and to hold connecting leads 15, 16. Alternatively, this function could be performed by other structural elements, e.g. a rod projecting perpendicularly from headwheel 20 at about the position of conduit 18 and bent at a right angle to extend toward axis 8 in order to support photodiode 9. The connecting leads could then be, for example, glued onto the rod. However, it is to be noted that, due to the high RPM of the headwheel, such eccentric masses should be kept small and be compensated by counterweights. Dimensions should be kept correspondingly small. An advantageous size for one of the glass bodies is, for example, a diameter of 15 millimeters (mm) and a height of 7 mm. For example, the transmitting converters can be on the rotor and the receiving converters can be on the stator, as shown in the upper half of FIG. 3, or the reverse, as shown in the lower half of FIG. 3 and in FIG. 1.

Figure 2:
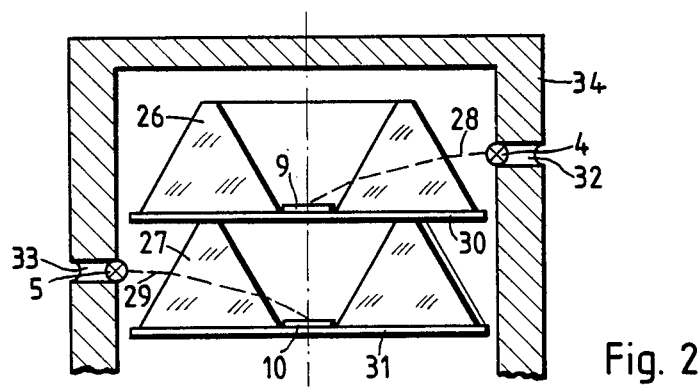
FIG. 2 is a longitudinal section through a second embodiment.

FIG. 2 illustrates a second embodiment of the invention, in which glass bodies 26, 27 are each shaped like a ring with a trapezoidal cross-section. This permits them to perform an additional function, namely bending light beams 28, 29 toward axis 8, thereby reducing the required height of the structure. For one thing, this is desirable for general structural reasons. Secondly, it makes the glass bodies lighter, so less energy is required to accelerate the rotor mass to operating speed. Each of glass bodies 26, 27 is mounted on a respective disk 30, 31, preferably opaque. Laser diode transmitters 4, 5 are mounted in bores 32, 33, preferably substantially horizontal, of stator 34. Connecting leads 35 (not shown) extend along the outside of glass body 27 and then radially inward to receiver/photodiode 9.

Figure 3:
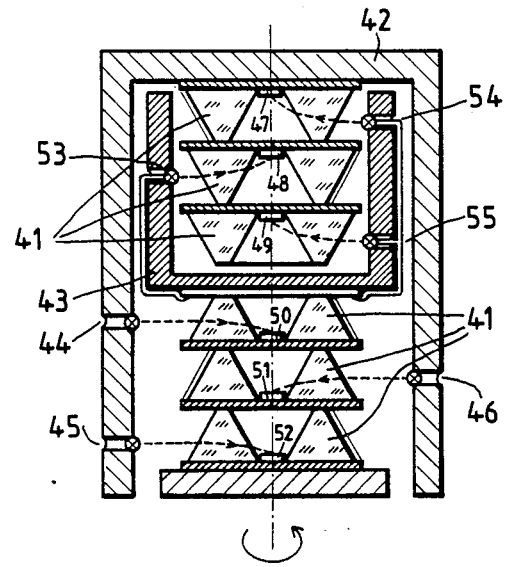
FIG. 3 is a longitudinal section through a third embodiment.

FIG. 3 illustrates a third embodiment of the invention, which features three channels for transmission of signals to the headwheel and three channels for transmission from the headwheel to the stationary portion of the device. Six identical glass bodies 41 are provided, of which 3 are connected with stator 42, as shown at the top of the figure, and of which 3 are attached to a rotatable hollow cylinder 43 to form the rotor, as shown at the bottom of the figure. Stator 42 contains three transmitters 44, 45, 46 and three receivers 47, 48, 49. The rotor contains three transmitters 53, 54, 55 and three receivers 50, 51, 52. The paths of the light beams and of the connecting leads correspond essentially to the embodiment of FIG. 2 and therefore need not be further detailed here.

Figure 4:
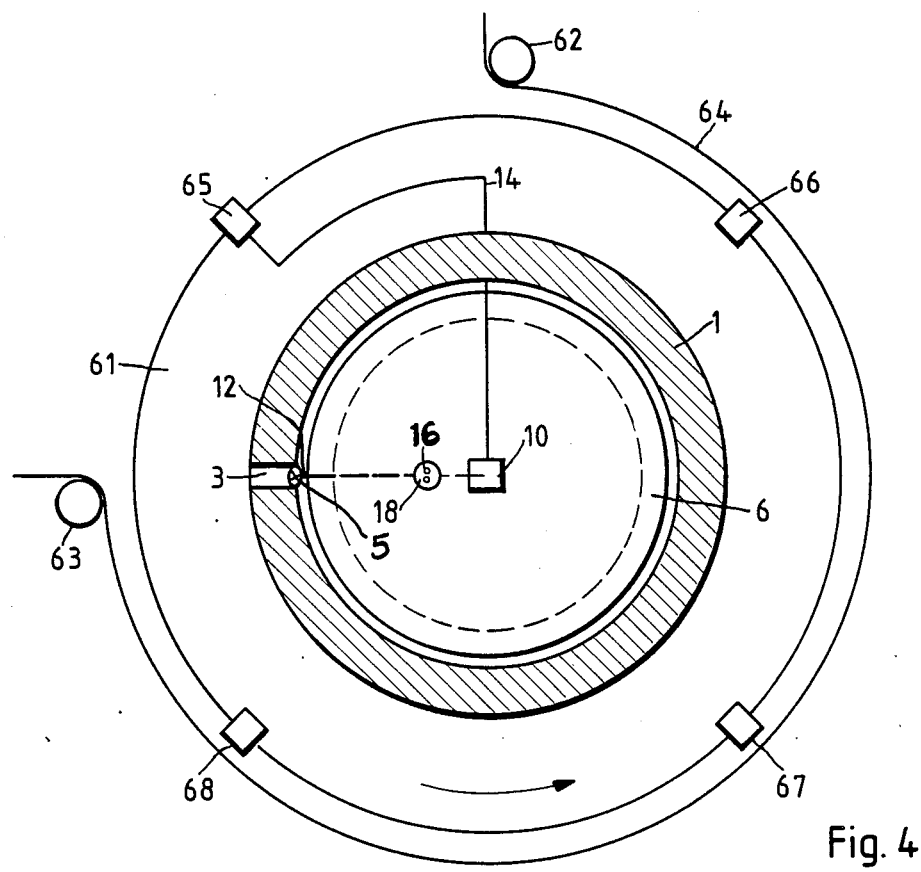
FIG. 4 illustrates the first embodiment along with the headwheel and a magnetic tape looping around the headwheel.

FIG. 4 schematically illustrates a headwheel 61, in which for simplicity only four magnetic heads are shown. Headwheels for magnetic recording of digital video signals typically have more magnetic heads, and apparatus according to the present invention can be equipped with correspondingly many transmission paths. Furthermore, nothing in the invention prevents multiple use of any of the transmission paths, should this be useful for a particular application.

With the aid of guide elements 62, 63, a magnetic tape 64 is looped about 270° around a headwheel 61. The magnetic heads 65, 66, 67, 68 are arranged at 90° intervals. Further, the central portion of FIG. 4 is a section taken along line X—X of the apparatus of FIG. 1.

Headwheel 61 rotates in the direction of the arrow and is depicted in FIG. 4 at a point in time in which conduit 18 and its leads 16 are interrupting the light beam 12 from laser diode transmitter 5. This of course interrupts signal transmission via receiver 10 and leads 16 to magnetic head 65. However, this causes no harm because, at this point in time, magnetic head 65 is not adjacent tape 64, but is in the 90° gap between 62 and 63.

Various changes and modifications are possible within the scope of the inventive concept, and features of one of the embodiments can readily be combined with features of another.

I claim:
1. In a device having a stationary first part of stator and a rotatable second part or rotor including a signal transducing element, a multi-channel electro-optical system for transmission of signals between said stator and rotor, comprising
at least two electro-optical transmitting converters, located on an arbitrarily selected one of said first and second parts, generating respective signal transmission beams, each representing a transmission channel between rotor and stator;
at least two opto-electrical receiving converters located on a predetermined axis of the other of said first and second parts and each receiving one of said beams;
the improvement comprising
that said beams strike said opto-electrical receiving converters at an acute angle with respect to said predetermined axis of said other part; and that
electrical connecting leads are located at least partially off said axis of said rotor, so that said leads block one of said transmission beams during at most a fraction of each rotation of said rotor, said leads connecting said converters on said rotor to said signal transducing element of said rotor.

2. The device including an electro-optical system according to claim 1, wherein
said opto-electrical receiving converters are supported in beam-receiving position by at least one disk-shaped transparent body, at least a portion of the transparent body being frusto-conical.

3. The device including an electro-optical system according to claim 1, wherein
said opto-electrical receiving converters are supported in beam-receiving position by at least one transparent body which is ring-shaped and has a trapezoidal cross-section.

4. The device including an electro-optical system according to claim 1, wherein
said electro-optical transmitting converters are located on said stator and
said opto-electrical receiving converters are located on said rotor.

5. The device including an electro-optical system according to claim 1, wherein
said electro-optical transmitting converters are located on said rotor and
said opto-electrical receiving converters are located on said stator.

6. The device including an electro-optical system according to claim 2,
including both stator-to-rotor transmission channels and rotor-to-stator transmission channels,
wherein
said rotor includes a plurality of opto-electrical receiving converters and respective transparent bodies supporting said converters, serving as receiving portions of said stator-to-rotor transmission channels, and a plurality of electro-optical transmitting converters serving as transmitting portions of said rotor-to-stator transmission channels, and
said stator includes a plurality of electro-optical transmitting converters serving as transmitting portions of said opto-electrical receiving converters and respective transparent bodies supporting said converters, serving as receiving portions of said rotor-to-stator transmission channels.

* * * * *